United States Patent [19]
Whatley, Jr.

[11] 3,880,132
[45] Apr. 29, 1975

[54] SOLID STATE IGNITION SYSTEM
[75] Inventor: Norman Whatley, Jr., San Francisco, Calif.
[73] Assignee: The Raymond Lee Organization, Inc., New York, N.Y. ; a part interest
[22] Filed: July 26, 1973
[21] Appl. No.: 383,130

[52] U.S. Cl. .................. 123/148 R; 123/148 MC; 315/209 CD
[51] Int. Cl. ............................................. F02p 1/00
[58] Field of Search .. 123/148 E, 148 OC, 148 MC; 315/209 CD

[56] References Cited
UNITED STATES PATENTS

| | | |
|---|---|---|
| 3,240,198 | 3/1966 | Loudon................................ 23/148 |
| 3,311,783 | 3/1967 | Gibbs................................. 315/226 |
| 3,587,550 | 6/1971 | Zechlin ........................... 123/148 E |

Primary Examiner—Charles J. Myhre
Assistant Examiner—Ronald B. Cox
Attorney, Agent, or Firm—Howard I. Podell

[57] ABSTRACT

A solid state ignition system for firing, in controlled fashion, the spark plugs of an internal combustion engine.

A rotating half phase alternator generates individual electrical pulses as it passes each of the several field coils in the generator. Each field coil is linked so as to simultaneously gate a silicon-controlled rectifier of a high tension voltage supply leading to the spark plugs, and to gate individual silicon-controlled rectifiers that individually regulate the firing of each spark plug.

1 Claim, 1 Drawing Figure

PATENTED APR 29 1975 3,880,132
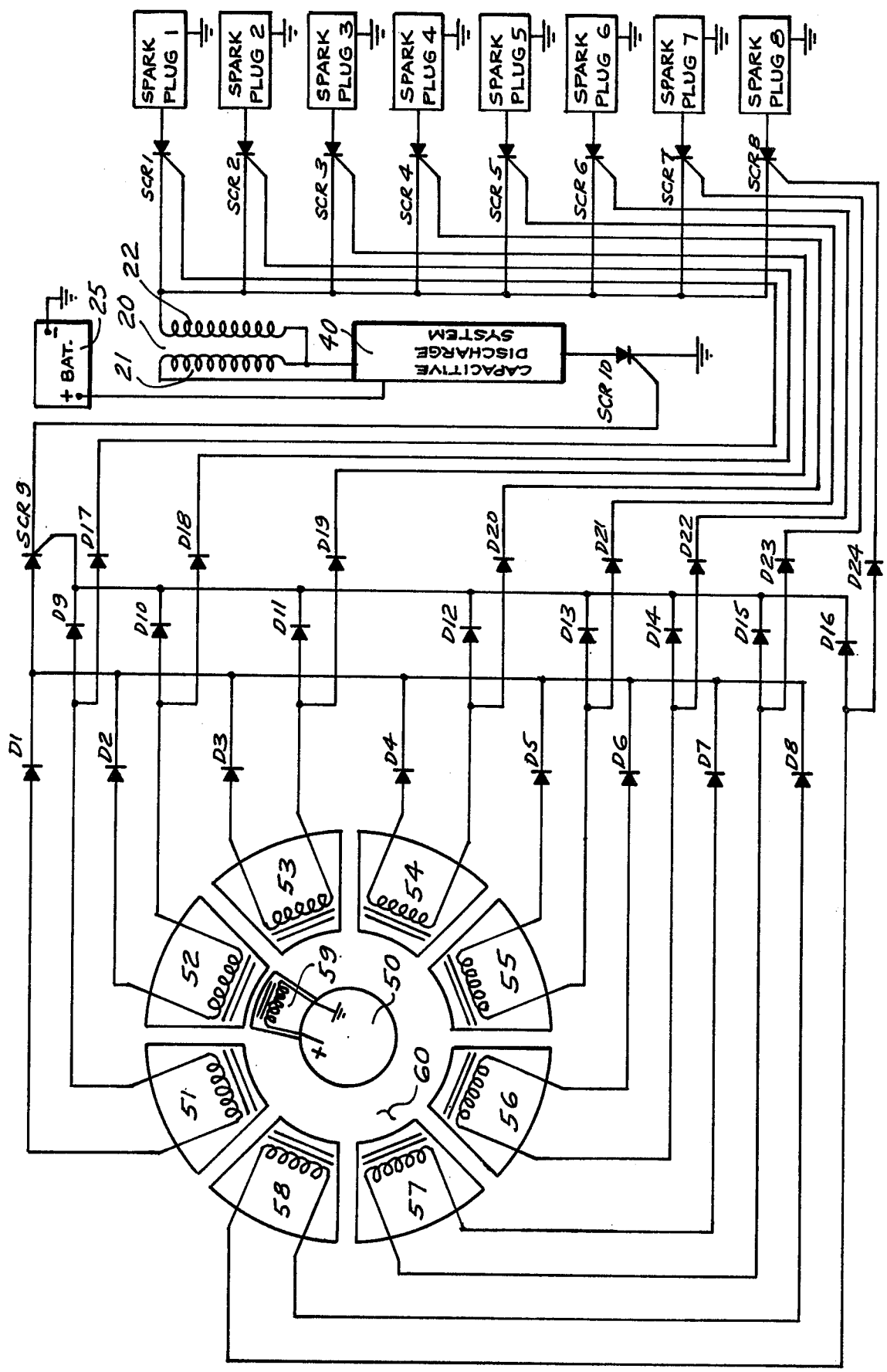

SOLID STATE IGNITION SYSTEM

SUMMARY OF THE INVENTION

This invention relates to a solid state ignition system for the control and firing of the spark plugs of an internal combustion engine.

The advantage of this system is that the control of firing of the spark plugs is maintained by a half-phase rotating alternator, with individual field coils powering the firing of each individual spark plug.

The alternator is linked to the rotation of the internal combustion engine, such that a rotating alternator coil generates a pluse in each of the fixed field coils, as the alternator coil rotates past each individual field coil The alternator incorporates a number of field coils equal to the total number of spark plugs to be fired, with each spark plug linked to the field coil by means of silicon-controlled rectifiers, diodes and a common high tension coil, such that the pulse generated by an individual field coil simultaneously gates the silicon-controlled rectifiers governing the operation of the high voltage pulse from the high voltage transformer and gates the silicon-controlled rectifier connecting the individual spark plug to the high tension coil of the transformer.

BRIEF DESCRIPTION OF THE DRAWINGS

The objects and features of the invention may be understood with reference to the following detailed description of an illustrative embodiment of the invention, taken together with the accompanying drawing which is a schematic view of the electronic circuitry of the invention.

DESCRIPTION OF THE PREFERRED EMBODIMENT

Turning now descriptively to the drawing, in which similar reference characters denote similar elements throughout the view, the drawing illustrates a half-phase alternator 60, with an alternator coil 59 mounted on the rotor 50 and supplied with a source of direct current voltage. Individual field coils 51–58 are mounted to the stator of the alternator such that rotation of alternator coil 59 past any individual field coil, such as field coil 51, produces a pulse of voltage in field coil 51. The voltage produced by each individual field coil 51–58, in turn, is passed by means of diodes D1-D8 through a silicon-controlled rectifier, SCR9, to the gate of a silicon-controlled rectifier SCR10 to trigger a capacitative discharge system 40. Capacitative discharge system 40 in turn, generates a pulse of high voltage electricity in the secondary coil 22 of transformer 20. Transformer 20 is fed by a source of direct current from battery 25 through low tension coil 21 when capacitative discharge system 40 is triggered by SCR10. SCR9 which triggers the gate of SCR10, is in turn gated by a pulse from the respective field coil 51–58 through a diode network of diodes D9–D16 so that one lead of the energized field coil triggers the gate of SCR9 to permit the other lead to conduct electricity to the gate of SCR10.

The energized field coil also, through a series of diodes D17–D24, triggers the respective silicon-controlled rectifier SCR1–SCR8 that individually link each spark plug, spark plug 1 – spark plug 8, to the high voltage side of voltage coil 22 of transformer 20.

The circuit will be described in the sequence for the firing of a specific spark plug, spark plug 3, as an example of how each spark plug 1–8 is individually fired, in turn.

Rotor 50 of alternator 60 rotates primary coil 59 past field coil 53 to generate a pulse of electricity in field coil 53. One side of field coil 53 is connected through diode D3 to SCR9, the output of SCR9 leading to the gate of SCR10. The other side of the coil 53 leads through diode D11 to the gate of SCR9, so that the pulse generated in coil 53 is automatically conducted through SCR9 to the gate of SCR10. The pulse of electricity generated in coil 53 is also lead through diode D19 to the gate of SCR3 so that the high voltage pulse of electricity produced in coil 22 of transformer 20 fires spark plug 3.

It is to be noted that SCR3 may be replaced by a series of silicon-controlled rectifiers joined in series so as to limit the voltage across each silicon-controlled rectifier to a safe value with each silicon-controlled rectifier being connected in series to the adjoining silicon-controlled rectifiers, and with all of the silicon-controlled rectifiers being gated by the common pulse generated by the respective field coil.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A solid state distribution system for the control of the ignition of spark plugs of an internal combustion engine, comprising an alternator which is linked by solid state diodes and silicon-controlled rectifiers to a capacitive discharge system that generates a pulse of high voltage electricity which is fed to each individual spark plug in turn, said alternator being fitted with a half-phase coil on the rotor of the alternator and with a number of individual field coils mounted on the stator of the alternator, with the number of field coils being equal to the number of spark plugs to be fired, such that rotation of the rotor of the alternator, bringing the rotor coil past a field coil, produces a pulse of electricity in the field coil, with a first lead of the two leads of the field coil being led through diodes to the input of a first silicon-controlled rectifier, and the pulse of electricity from the second lead of the individual field coils being led through diodes to the gate of the said first silicon-controlled rectifier and also led through other diodes to the gate of a second silicon-controlled rectifier in series with the spark plug to be fired, with the outut of the said first silicon-controlled rectifier led to the gate of a third silicon-controlled rectifier, the third silicon-controlled rectifier being connected to fire, in the triggered mode, the capacitative discharge system to produce a pulse of high voltage led to each of the silicon-controlled rectifiers connected individually in series with each of the spark plugs, with the said second silicon-controlled rectifier, in series with a spark plug, which is gated by the current produced from a specific field coil conducting the high tension pulse produced by the capacitative discharge system to fire the respective spark plug.

* * * * *